United States Patent [19]

Kurematsu et al.

[11] Patent Number: 5,770,019
[45] Date of Patent: Jun. 23, 1998

[54] APPARATUS FOR CONCENTRATING WASTE LIQUID

[75] Inventors: Masayuki Kurematsu; Satoshi Yuzawa, both of Hino; Shoichi Kuroda, Chiba; Souichiro Shibata, Tokyo; Noriyuki Shimamura, Chiba; Toshiaki Kawada, Oizumi-machi; Yuio Yoshiokaya, Ashikaga, all of Japan

[73] Assignees: Konica Corporation; The Tokyo Electric Power Company, Incorporated; Sanyo Electric Co., Ltd., all of, Japan

[21] Appl. No.: 354,937

[22] Filed: Dec. 13, 1994

Related U.S. Application Data

[63] Continuation of Ser. No. 81,861, Jun. 23, 1993, abandoned, which is a continuation of Ser. No. 827,365, Jan. 29, 1992, abandoned.

[30] Foreign Application Priority Data

Jan. 31, 1991 [JP] Japan ........................................ 3-32055
May 9, 1991 [JP] Japan ...................................... 3-104507

[51] Int. Cl.$^6$ .............................. B01D 3/10; B01D 3/42; C02F 1/04
[52] U.S. Cl. ........................ 202/160; 62/238.5; 62/238.7; 202/186; 202/205; 203/DIG. 4; 203/1; 203/2; 159/44
[58] Field of Search ..................................... 202/160, 205, 202/186; 203/2, 1, DIG. 4, 87, DIG. 18; 159/44, 47.3, DIG. 16, DIG. 23; 62/238.5, 238.7; 354/299

[56] References Cited

U.S. PATENT DOCUMENTS

| | | | |
|---|---|---|---|
| 3,733,994 | 5/1973 | Armstrong et al. | 202/152 |
| 4,003,798 | 1/1977 | McCord | 202/170 |
| 4,299,664 | 11/1981 | Smith | 202/170 |
| 4,556,457 | 12/1985 | McCord | 203/DIG. 4 |
| 4,585,524 | 4/1986 | Hoiss | 203/24 |
| 4,828,717 | 5/1989 | Deleeuw et al. | 159/47.3 |
| 4,940,134 | 7/1990 | Aoki et al. | 159/47.3 |
| 4,961,859 | 10/1990 | Uehara et al. | 119/47.3 |
| 5,004,522 | 4/1991 | Kobashi | 159/47.3 |

FOREIGN PATENT DOCUMENTS

| | | | |
|---|---|---|---|
| 0223605 | 5/1987 | European Pat. Off. | 159/47.3 |
| 0009202 | 3/1984 | Japan | 203/DIG. 4 |

*Primary Examiner*—Virginia Manoharan
*Attorney, Agent, or Firm*—Bierman and Muserlian

[57] ABSTRACT

When waste liquid is concentrated using a radiant heat section and a heat absorbent section of a heat pump circuit, in the proper place of the heating region of the heat pump circuit, a detector for detecting the pressure and/or temperature of the heat transfer medium is provided, or a detector for detecting the value of an electric current flowing through or the amount of electric power consumed in a system which includes a compressor for the heat pump circuit, is provided, and by the provision of a control system which can halt the concentration operation when the detected value exceeds a set value, both with a liquid in which the concentration of the non-volatile component is low so that a comparatively long time is required for the concentration operation, and, conversely, with a liquid in which the concentration of the non-volatile component is high so that the concentration operation is completed in a comparatively short time, the concentration operation has good efficiency, and can always be halted at a uniform liquor concentration.

2 Claims, 3 Drawing Sheets

APPARATUS FOR CONCENTRATING WASTE LIQUID

This application is a continuation of application Ser. No. 08/086186 filed Jun. 23, 1993, now abandoned which is a continuation of 07/827,365, filed Jan. 29, 1992 now abandoned.

BACKGROUND OF THE INVENTION

1. Field of the Invention

The present invention relates to an apparatus for concentrating waste liquid such as an aqueous solution from a photographic process containing photosensitive materials such as silver halide.

2. Description of the Prior Art

Conventionally, photosensitive materials such as silver halide are processed by a combination of processes using process liquors relating to one or more functions such as developing, fixing, washing, and the like, for black and white photography, and color developing, bleaching/fixing, (or bleaching and fixing), washing, stabilizing, and the like, in the case of color photography. In a photographic process wherein large amounts of photosensitive materials are handled, a method is adopted to maintain the ability of the process solutions by replenishing the components which are consumed in the process and removing components (for example, bromide ions in the developing solution, or complex silver salts in the fixing solution) which pass from the photosensitive material to the process liquor, or are concentrated by evaporation, to guarantee the uniformity of the components of the process solution. This replenishment is accomplished by adding replenishing solutions to the process solutions, and discarding part of the process solution to remove components which have been concentrated in the photographic process.

In recent years changes have been occurring toward the establishment of a system in which the quantities for replenishment of the process liquid, including wash water used in a washing process, are considerably reduced to minimize pollution or for economic reasons. The waste liquid from the photographic process is passed from the process tank of the automatic developing machine through the waste liquid piping and is diluted with the cooling water used in the automatic developing machine or the waste liquid used in the washing process and discharged to sewer or the like. However, the discharge of photographic process liquids other than these (for example, developing solution, fixing solution, color developing solution, bleaching/fixing, (or bleaching and fixing) solution, stabilizing solution, and the like) is essentially impossible.as a result of the recent strengthening of pollution regulations. For this reason, companies in the photographic processing industry usually contract with other companies specializing in waste disposal to dispose of their waste liquids, or install antipollution equipment. When the waste disposal is entrusted to a specialist, the waste materials must be temporarily stored, which requires a lot of space, and the cost is extremely high. By the same token, the installation of antipollution equipment has the drawbacks that the first cost is very high and an extremely large area is required for installation of the equipment.

Specific methods for reducing the pollution load from waste liquid from the photographic process which are commonly known include (1) activated sludge processes (for example, Japanese Patent Publications 51-12943, 51-7952, and the like); (2) evaporation processes (Japanese Laid Open Patent Applications 49-89437, 56-33996, and the like); (3) electrolytic oxidation processes (Japanese Laid Open Patent Applications 48-84462, 49-119457, 49-119458, Japanese Patent Publication 53-43478, and the like); (4) ion exchange methods (Japanese Patent Publication 51-37704, 53-43271, Japanese Laid Open Patent Application 53-383, and the like); (5) reverse osmosis methods (Japanese Laid Open Patent Application 50-22463); and (6) chemical processing methods (Japanese Laid Open Patent Applications 49-64257, 53-12152, 49-58833, 53-63763, Japanese Patent Publication 57-395, 57-37396, and the like), but these have not proved to be adequate.

Because of restrictions related to water resources, the increasing costs for water supply and disposal, the ease of installing and operating automatic developing machines, the operating environment around automatic developing machines, and the like, there has recently been a trend toward use of the stabilizing process in place of water washing, so that the photographic process using an automatic developing machine with no external piping hook up for the supply and discharge of wash water (the so-called waterless developing machine) is becoming popular. With this type of process the elimination of cooling water for controlling the temperature of the process solutions is also desired.

Because only small amounts of waste liquid are obtained from an automatic developing machine using a photographic process which essentially does not use wash water or cooling water, external piping for water supply and disposal can be omitted.

This results in the elimination of the drawbacks of conventional automatic developing machines (lack of mobility after installation because of the piping, lack of space, high cost of running piping during installation, cost of energy for hot water supply, and the like). The major advantages of compactness and ease of operation can therefore be demonstrated, making it possible to use an automatic developing machine as a piece of office equipment.

However, as opposed to these advantages, because this waste liquid is not diluted, it represents an extremely high pollution load so that pollution control regulations make it impossible to dispose of this material in waterways or the sewage system. Further although this type of photographic process (using large volumes of running water and no wash water) generates only small quantities of waste material, even a relatively small-scale color processing laboratory will produce about 10 liters per day.

The waste liquid from such a color processing laboratory is usually collected by a specialist company and subjected to a secondary or tertiary processing to render it non-polluting. However, not only is the cost of removing waste liquid rising year after year owing to the rising costs of collection, but the efficiency of collection is poor, so that the waste liquid is seldom collected by the specialist company and the shop fills up with these wastes. In order to solve such problems, research has also been conducted into the handling of photographic process waste liquid from small color processing laboratories, by heating, evaporating off the water to the point of drying and hardening, or simply hardening (for example, as disclosed in Japanese Laid Open Patent Application 60-70841). In addition, a device has been developed using a radiant heat section and a heat absorbent section of a heat pump circuit as a heating means for an evaporating vessel for concentrating waste water, and as a cooling means for a cooling vessel for cooling and condensing the vapor.

However, because the amounts of the water component and of the non-volatile component differ in various aqueous solutions of waste water from a photographic process, the concentration time is not uniform. Accordingly, when the amount of time for a concentration operation is set by a timer or the like, there is concern that operational errors will be produced. Specifically, when the operating time of the timer or the like is fixed, not only is the efficiency of the operation poor when the liquid contains a low concentration of the non-volatile component and time wasted when the concentration is high, but the device is subjected to rough usage which could shorten its life expectancy.

SUMMARY OF THE INVENTION

An object of the present invention is to provide, with due consideration to the drawbacks of such conventional devices, an apparatus for concentrating aqueous solutions which, when used with a solution in which the concentration of non-volatile component is low so that the concentration operating time is comparatively long, and, conversely, when used with a solution in which the concentration of a non-volatile component is high so that the concentration operating time is comparatively short, performs the concentration operation with good efficiency, and can always halt the operation at a fixed concentration.

This object of the present invention is achieved by the provision of an apparatus for concentrating waste liquid comprising an evaporating vessel which utilizes a radiant heat section of a heat pump circuit as a heating means; a cooling vessel which utilizes a heat absorbent section of a heat pump circuit as a cooling means for cooling and condensing the vapor; a pressure reducing means, in communication with both the evaporating vessel and the cooling vessel, for reducing the pressure throughout the entire apparatus; a detector for detecting a condition of the heat pump operations (for example, a detector for detecting the pressure or the temperature of a heat transfer medium) suitably positioned in the heating portion of the heat pump circuit; or a detector for detecting the value of an electric current flowing through or the amount of electric power consumed in a system which includes a compressor for the heat pump circuit; and means for controlling the operation of the concentration process to halt the concentration operation when the detector detects a value which exceeds a set detection value; wherein the concentration process can be completed within a minimum time with good efficiency whether the concentration of a non-volatile component is high or low.

In this case, a suitable position for the detector for detecting the pressure of the heat transfer medium is between the compressor and the radiant heat section of the heat pump circuit, or between the radiant heat section of the heat pump circuit and an expansion valve or a capillary tube. The pressure setting of course varies according to the respective position of the device.

BRIEF DESCRIPTION OF ACCOMPANYING DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

An embodiment of the evaporator concentrator of the present invention will now be explained with reference to the drawings.

Figure 1:
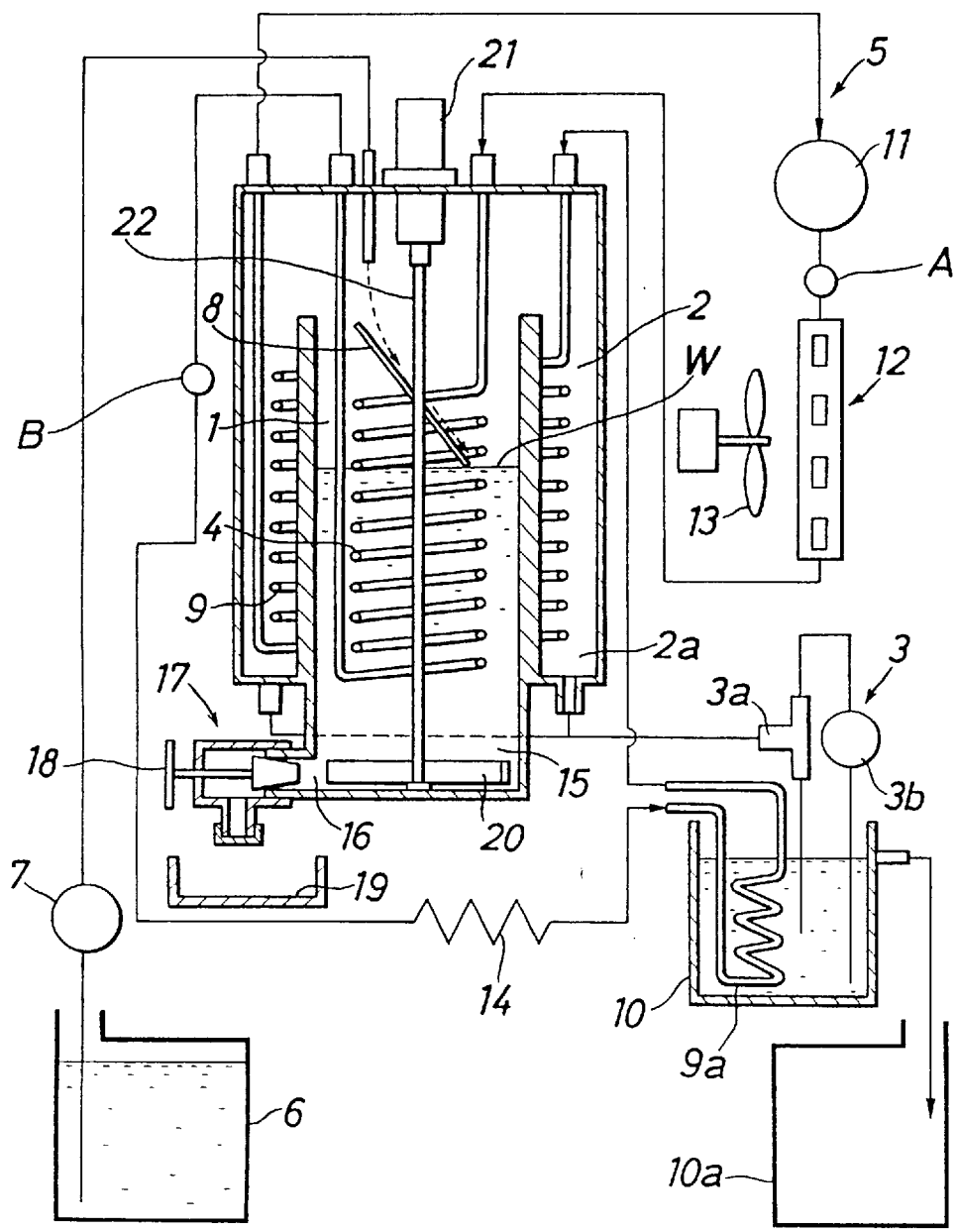
FIG.1 is a schematic diagram of a concentrating apparatus of the present invention.

FIG.1 shows an evaporating vessel 1, capable of operating under reduced pressure, containing a charge of an aqueous solution (specifically, waste liquid from a photographic process). The reference numeral 2 designates a cooling vessel provided concentrically around the outer periphery of the evaporating vessel 1, wherein the upper part of the cooling vessel 2 communicates with the evaporating vessel 1 and is connected to a pressure reducing means 3 (which may be an ejector, a vacuum pump, or the like) for reducing the pressure within the vessels 1 and 2. It is commonly known that when the internal pressure in the evaporating vessel 1 is less than atmospheric pressure, boiling will occur at a point below the normal boiling point of the aqueous solution. In this embodiment of the present invention, the evaporation is carried out under reduced pressure at a low temperature at which gas generation occurs only with difficulty.

A radiant heat section of a heat pump circuit 5 is utilized as a heating means 4 arranged three dimensionally in the evaporating vessel 1. The surface temperature of the heating means 4 is maintained at 100° C. or less during evaporation under reduced pressure and, most preferably, is maintained in the 20° to 60° C. range within which the generation of malodorous gases is prevented. The lower part of the heating means 4 is immersed in waste liquid W from a photographic process and the upper section projects from the liquor surface and is exposed to the air. The reason for positioning the heating means 4 three-dimensionally so that it extends from within the liquor into the vapor is because this makes it possible to provide heating simultaneously within the liquor and at the liquor surface, with good efficiency.

The reference numeral 6 designates a storage tank in which is stored the photographic process waste liquid W coming from a shop with a color process laboratory. A pumping means 7 equipped with a solenoid valve is provided for pumping the waste liquid from the storage tank 6 to supply the evaporating vessel 1. The pumping means 7 is operated when the liquor surface has dropped to a preset level as a result of the evaporation of the liquor in the evaporating vessel 1. The waste liquid pumped by the pumping means 7 is either sprayed directly onto the heating means 4 projecting into the vapor in the evaporating vessel 1, or fed via a suitable baffle plate 8, as shown in FIG.1, so that the surface of the liquor is not disturbed. The part of the heating means 4 in the liquor and the part in the vapor are normally maintained at the same temperature, but in this case the part in the vapor actually has a higher surface temperature because of the difference in the heat transfer effect. For this reason, spraying the supply liquor directly onto the heating means 4 can cause the generation of a gas with an offensive odor because of rapid heating. As a countermeasure, either the supply volume must be increased/decreased, or the temperature of the heating means 4 in the vapor must be held below the gas generation temperature. It is also possible to control the two parts of the heating means 4, which are immersed in and project from the liquor, at different, more suitable temperatures.

The heat absorbent section of the heat pump circuit 5 is utilized as a cooling means 9, positioned inside the cooling vessel 2, and serves to cool, condense, and trap the water vapor which has been evaporated and passed into the upper space of the evaporating vessel 1 to enter the cooling vessel 2. The condensate is collected in a bottom section 2a of the cooling vessel 2 and is recovered in an external recovery vessel 10. The condensate is recovered by the pressure reducing means 3 which is an ejector 3a in this embodiment of the present invention. Specifically, the water in the condensate recovery vessel 10 is pumped by a pump 3b, passes through the vertical tube of the ejector 3a, and returns into the vessel 10. Because a vacuum is created at the junction of a vertical tube and a horizontal tube, the liquid collected in the bottom section 2a of the cooling vessel 2 which is in communication with the horizontal tube, and the vapor in the evaporating vessel 1 in communication with the cooling vessel 2 is aspirated and contributes to stabilizing the pressure between the two vessels. Because the condensation and the recovery of the condensate are continuous, when the pressure in the evaporating vessel 1 drops because of the creation of vapor, the reduced pressure balance is destroyed, the vapor is immediately condensed, and the pressure drop is effectively restrained. A storage vessel 10a is provided to store the water which overflows from the recovery vessel 10, and the water collected in the vessel 10a flows, as is, to sewer with no problem.

The reference numeral 11 designates a compressor for compressing the heat transfer medium in the heat pump 5. An air cooling means 12 for cooling the heat transfer medium is provided at the upstream side of the heating means 4 of the evaporating vessel 1. The air cooling means 12, which is provided with a fan 13, controls the temperature of the heat transfer medium compressed by the compressor 11 so as to be in a predetermined range of temperature responsive to a detector 23 (later explained). A heat absorbent section positioned downstream from a capillary tube 14 which plays the role of an expansion valve, is utilized as a cooling means 9a for the water inside the condensate recovery vessel 10 and as the cooling means 9 inside the cooling vessel 2. Specifically, the capillary tube 14 is interposed between an upstream heating region and a downstream cooling region. The heat transfer medium after passing through the cooling means 9 of the cooling vessel 2 is then recycled to the compressor 11.

A slurry collection section 15 which collects a repeatedly vaporized and condensed component which has been solidified at a high concentration (slurry) is provided on the bottom of the evaporating vessel 1. A slurry withdrawal port 16 which projects from the sidewall outer surface at the same level as the bottom surface of the slurry collection section 15 is hermetically sealed by a stopper means 17. The stopper means 17 may be a ball valve, a butterfly valve, a slide valve, or the like, and, in the embodiment shown in the drawing, is formed from a packing material to maintain the reduced pressure conditions in the evaporating vessel 1. A handle means 18 is provided so that the slurry withdrawal port 16 can be opened and closed by pulling or pressing the stopper means 17 A slurry recovery vessel 19 is also provided.

An impeller 20 provided in the slurry collection section 15 is secured to the lower end of an output shaft 22 which is vertically suspended from a drive source 21 positioned on the head surface of the evaporating vessel 1. The impeller 20 can provide agitation over the entire inside bottom surface of the slurry collection section 15 and is formed in a shape which allows the slurry to be easily swept toward the slurry withdrawal port 16. A shape which allows manual rotation by operating a wheel is also acceptable.

Figure 2:
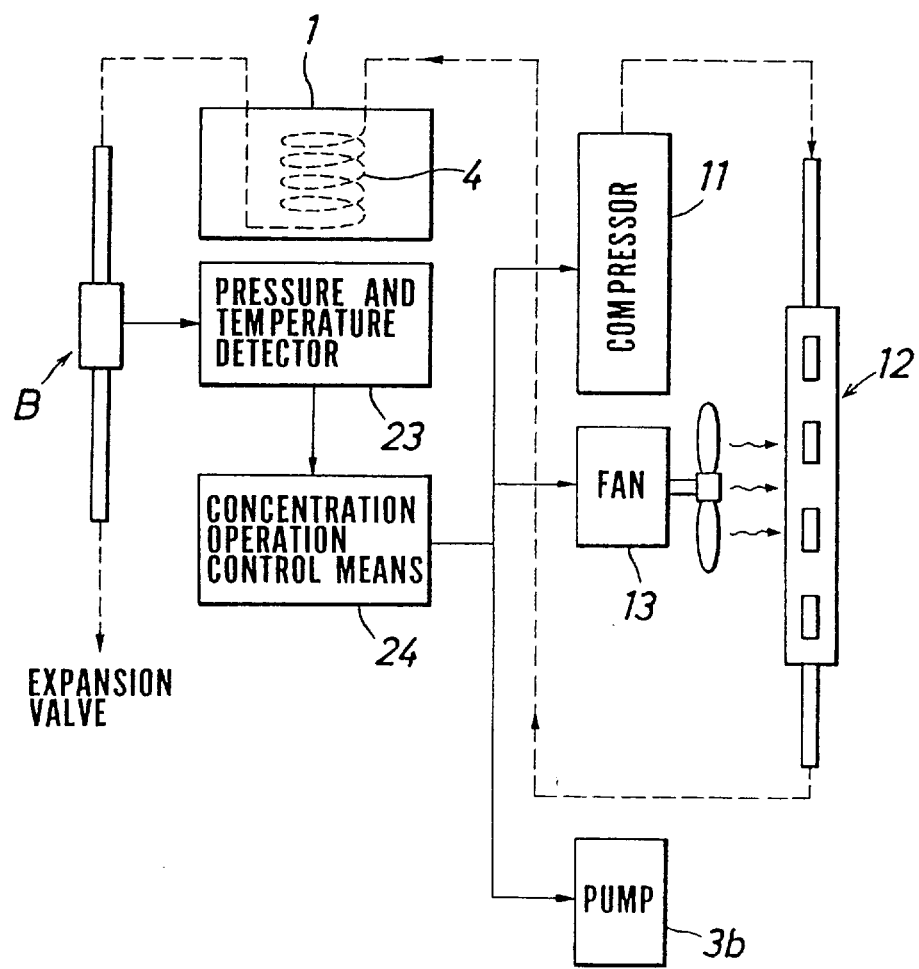
FIG.2 is a block diagram for control of the concentration operation by detecting the pressure of the heat transfer medium.

A detector 23 is provided for detecting the pressure and temperature of the heat transfer medium at preferable positions A or B in the heating area (between the compressor 11 and the capillary tube 14) of the heat pump circuit 5. The detector 23 is connected to a fork in a heat transfer medium introduction pipe. A concentration operation control means 24 compares a pressure detected by the detector 23 with a value preset on a pressure setting apparatus (omitted from the drawing), and if the detected pressure exceeds the preset value, regardless of whether the concentration of the non-volatile component is high or low, when the concentration operation is judged to have been completed at a uniform concentration, as shown in FIG.2, the compressor 11, the air cooling fan 13 of the air cooling means 12, and the pump 3b of the pressure reducing means 3 are halted and an "operation completed" display is shown in a display window (omitted from the drawing) or the completion of the operation is indicated by a voice generating means. It is preferable that the stoppage of the pump 3b only of the pressure reducing means 3 be delayed until after the evaporating vessel and the cooling vessel revert to atmospheric pressure. This is to prevent the condensed water from flowing back into the evaporating vessel and the cooling vessel.

When Freon Gas R-22 is used as the heat transfer medium, it is preferable that the pressure be set between 15 to 18 $kg/cm^2$ for normal operation and 20 to 28 $kg/cm^2$ for stoppage. The most desirable setting is between 22 to 25 $kg/cm^2$.

The detector 23 may be a device for detecting the temperature of the heat transfer medium from the surface temperature of the pipe which introduces the heat transfer medium. The detector 23 is provided with a temperature setting apparatus and a comparator. When the measured temperature is compared with the temperature set in the temperature setting apparatus and is found to have reached this set temperature, the judgement is made that both with liquids in which the concentration of the non-volatile component is low and in which the concentration of the non-volatile component is high, the concentration operation is halted at a uniform liquor concentration, and a halt signal is output to the concentration operation control means 24 as shown in FIG.2. On receiving this signal, the concentration operation control means 24 operates as previously described.

At the installed location A of the detection device 23, specifically, between the compresser 11 of the heat pump circuit 5 and the air cooling means 12, the temperature of the heat transfer medium is taken directly after pressure is applied by the compressor 11 and a high temperature is reached so that the set temperature is in the range from 80° to 130° C. At the installed location B, specifically, between the radiant heat section of the heating means 4 of the evaporating vessel 1.and the expansion valve or the capillary tube 14, the heat has already been absorbed by the evaporating vessel 1, so the set temperature is in the range from 45° to 80° C.

In the above-described embodiment, the pumping means 7 is activated and the waste liquid W is filled into the evaporating vessel 1 to the required level. Tap water is also filled into the condensate recovery vessel 10 and stored. The compressor 11 and the pump 3b of the pressure reducing means 3 are then started up. The heating means 4 in the evaporating vessel 1 is heated to a specified temperature and the cooling means 9 of the cooling vessel 2 is cooled by the heat transfer medium which is caused to flow by the operation of the compressor 11. The waste liquid boils at a temperature below its normal boiling point, for example, at 35° C., because the pressure in the evaporating vessel 1 and the cooling vessel 2 is reduced via the ejector 3a from the action of the pump 3a.

The water vapor evaporated in the evaporating vessel 1 passes into the upper space of the vessel 1 and proceeds into the cooling vessel 2. Here it is cooled and condensed to water droplets which are collected in the bottom section 2a of the cooling vessel 2, and is recovered in the recovery vessel 10 provided outside the apparatus by the drawn vacuum. The amount of waste liquid previously charged into the vessel 1 is reduced as a result of the vaporization, the pumping means 7 is activated, the evaporating vessel 1 is repeatedly replenished with liquor to replace that lost by vaporization, and the waste liquid is steadily concentrated. The component which solidifies at high concentration becomes a slurry and is collected in the slurry collection section 15 provided at the bottom of the evaporating vessel 1.

When the density of the waste liquid in the evaporating vessel 1 increases, transmission of the heat from the heat transfer medium to the waste liquid becomes difficult. This is because the periphery of the radiant heat section enters the equivalent of an adiabatic state.

Specifically, the heat transfer medium, which is compressed to a high pressure and high temperature by the compressor 11, radiates the heat in the waste liquid (low density) in the evaporating vessel 1 while flowing over the heating means 4, and, on reaching the capillary tube 14, is expanded to a low pressure and low temperature, absorbs heat from the water in the condensate recovery vessel 10 via the cooling means 9a and the the cooling means 9 in the cooling vessel 2, and returns to the compressor 11,; where once again it is compressed to a high pressure and temperature and is repeatedly supplied to the radiant heat section.

In this manner, when the density of the waste liquid in the evaporating vessel 1 is high, it is difficult for the heat transfer medium to absorb the heat from the liquid, therefore the pressure and temperature of the heat transfer medium are comparatively high when the density of the waste liquid is low. As a result, the pressure or the temperature of the heat transfer medium cannot be kept in the predetermined range by radiating heat from the heat transfer medium at the cooling means 12, so the completion of the concentration process, can be determined by detecting a condition of the heat transfer medium (for example, the pressure, the temperature, or the like) at the previously mentioned A or B positions in the detector 23, .

Specifically, the pressure or the temperature of the heat transfer medium is detected by the detector 23, and the concentration operation control means 24 is activated when this value exceeds a set value. The compressor 11, the air cooling fan 13 of the air cooling means 12, and the pump 3b of the pressure reducing means 3 are then halted, and an "operation completed" display is shown in a display window (omitted from the drawing) or the completion of the operation is indicated by a voice generating means. As a result, it is always possible to complete the operation at a uniform liquor concentration, both with a liquor in which the concentration of the non-volatile component is low so that a comparatively long time is required for the concentration operation, and, conversely, with a liquor in which the concentration of the non-volatile component is high so that the concentration operation is completed in a comparatively short time.

Figure 3:
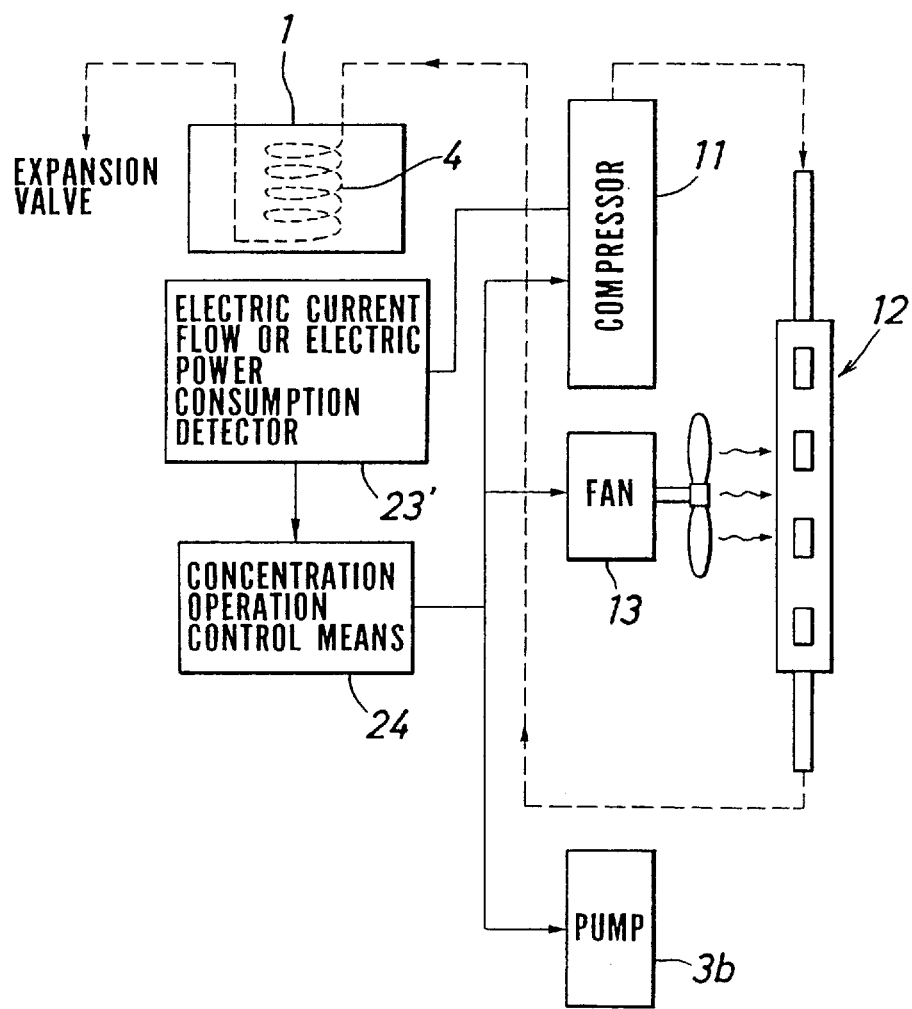
FIG.3 is a block diagram for control of the concentration operation by detecting the value of electric current flowing through or the amount of electric power consumed in a compressor.

In FIG. 3, a detector 23', which detects the value of in a system which includes the compressor 11, can be used in place of or together with the heat transfer medium pressure detector 23 to determine the concentration of the waste liquid, specifically, to determine the completion of the concentrating operation. As previously outlined, when the concentration of the liquor in the evaporating vessel 1 is high so that the temperature and pressure of the heat transfer medium are high, the load on the compressor for compressing the heat transfer medium increases. The value of the electric current flowing through or the value of electric power consumed in the system which includes the compressor 11 therefore increases, and when this increase exceeds a set value (usually a 5 to 20% increase in the normal value), it is possible to complete the operation at a uniform liquor concentration, as described above, by halting the concentration operation through the action of the concentration operation control means 24.

In this manner, when the completion of the concentration operation is determined from the pressure or the temperature of the heat transfer medium at a preferable location in the heating portion of the heat pump circuit A or B positions shown in FIG.1, or from the value of electric current flowing through, or the amount of electric power consumed, in the system which includes the compressor for the heat pump circuit, the hermetically sealed slurry removal port 16 is opened and the slurry collected on the bottom of the evaporating vessel 1 is withdrawn into the slurry recovery vessel 19. During this withdrawal, the impeller 20 is rotated by the drive source 22 so that the slurry is withdrawn with good efficiency.

As described above, an apparatus for concentrating waste liquid is provided comprising an evaporating vessel which utilizes a radiant heat section of a heat pump circuit as a heating means; a.cooling vessel which utilizes a heat absorbent section of a heat pump circuit as a cooling means for cooling and condensing the vapor; a pressure reducing means in communication with the evaporating vessel and the cooling vessel for reducing the pressure throughout the entire apparatus; a detector for detecting a condition of the heat pump operation (for example, a detector for detecting the pressure or the temperature of a heat transfer medium, suitably positioned in the heating portion of the heat pump circuit; or the detector for detecting the value of an electric current flowing through or the amount of electric power consumed in a system which includes a compressor for the heat pump circuit). When the value detected by these detectors exceeds a preset value, it is always possible to complete the operation at a uniform liquor concentration because a concentration operation control means is provided which halts the concentration operation, both with a liquor in which the concentration of the non-volatile component is low so that a comparatively long time is required for the concentration operation, and, conversely, with a liquor in which the concentration of the non-volatile component is high so that the concentration operation is completed in a comparatively short time. The process is therefore efficient, and there is no waste of operating time and the like.

What is claimed is:

1. An apparatus for concentrating waste liquid, said apparatus comprising:

an evaporator including an evaporation chamber for concentrating waste liquid, wherein at least a part of said waste liquid is evaporated in said chamber to form a vapor;

a condenser including a condensation chamber wherein said condensation chamber communicates with said evaporation chamber to receive said vapor, at least a part of said vapor being cooled to form a condensed liquid;

a pressure reducer connected with at least one of said evaporation chamber and said condensation chamber for reducing pressure therein and for removing said condensed liquid, whereby a concentration of a non-evaporating component in said waste liquid in said evaporation chamber is increased;

a heat pump circuit having a looped sequence including a compressor, a heat radiating portion, an expander, and a heat absorbing portion, a heat transfer medium circulating through said heat pump circuit, said heat radiating portion including an immersed portion immersed in said waste liquid in said evaporation chamber, and said heat absorbing portion including a cooling portion provided in said condensation chamber, a temperature or a pressure of said heat transfer medium circulating in said heat pump circuit varying in accordance with the concentration of said non-evaporating component in said waste liquid;

a detector provided downstream of said immersed portion in said heat radiating portion of said heat pump circuit, detecting said temperature or pressure of said heat transfer medium, and generating a detection signal based on said temperature or pressure;

an auxiliary cooler, provided between said compressor and said expander in said heat pump circuit, cooling said heat transfer medium; and a controller for controlling said auxiliary cooler and the concentration operation of said apparatus responsive to said detection signal from said detector, said controller stopping the operation of said apparatus when said detection signal reaches a predetermined value signifying that the concentration of said waste liquid has risen to a desired concentration.

2. The apparatus of claim 1 wherein said waste liquid is a waste liquid of a photographic process.

* * * * *